Aug. 9, 1966

G. MEYER 3,265,250

ALL PLASTIC HEAT INSULATED JUG

Filed May 29, 1962

INVENTOR.
GERSON MEYER

BY
Albert J. Kramer
ATTORNEY

Aug. 9, 1966 G. MEYER 3,265,250
ALL PLASTIC HEAT INSULATED JUG
Filed May 29, 1962 2 Sheets-Sheet 2

INVENTOR.
GERSON MEYER
BY
Albert J. Kramer
ATTORNEY

United States Patent Office 3,265,250
Patented August 9, 1966

3,265,250
ALL PLASTIC HEAT INSULATED JUG
Gerson Meyer, Baltimore, Md., assignor to Life-Like Products Inc., Baltimore, Md., a corporation of Maryland
Filed May 29, 1962, Ser. No. 198,668
8 Claims. (Cl. 222—131)

This invention relates to containers and it is more particularly concerned with portable containers commonly referred to as heat insulated jugs for keeping liquids hot or cold for prolonged periods and useful on occasions of picnics and outings of various kinds.

One of the objects of the invention is the provision of a heat insulated jug constructed of a light weight, yet sturdy, material such as a foamed plastic to render it easy to carry about and at the same time resist damage by outdoor handling to which such articles are typically subjected.

Another object is the provision of a heat insulated jug having a high degree of thermal insulating efficiency.

A further object is the provision of a heat insulated jug having novel features of construction, including an all plastic construction, that results, in addition to a high degree of thermal efficiency, in the ability to rapidly fabricate and assemble its parts and which obviates the need for any metallic part.

A still further object of the invention is the provision of a heat insulated jug having a large portion of its exterior surface insulated as compared to conventional heat insulated jugs of the prior art.

A still further object of the invention is the provision of various improvements in a heat insulated jug to increase its usefulness, simplify its manufacture, and enhance its conventional characteristic features.

These objects and still further objects, features and advantages of the invention will appear more fully from the following description considered together with the accompanying drawing:

Figure 1:
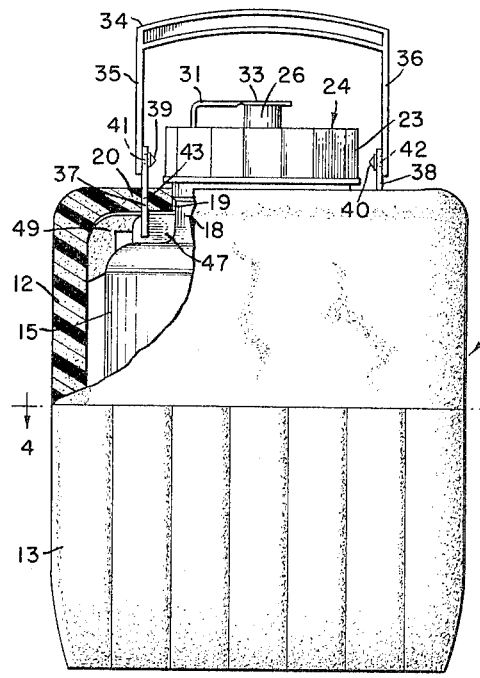
FIG. 1 is a front elevational view of an embodiment of the invention partly broken away.
Figure 2:
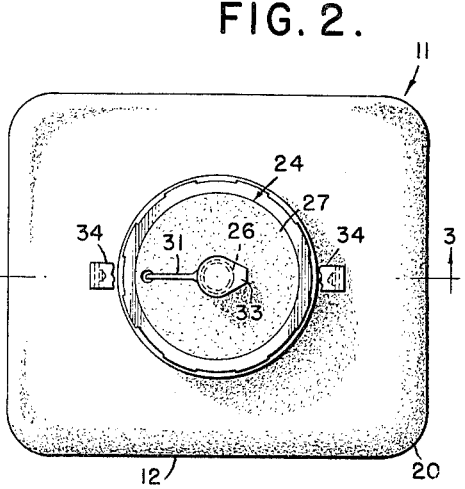
FIG. 2 is a top plan view of the embodiment partly broken away.
Figure 4:
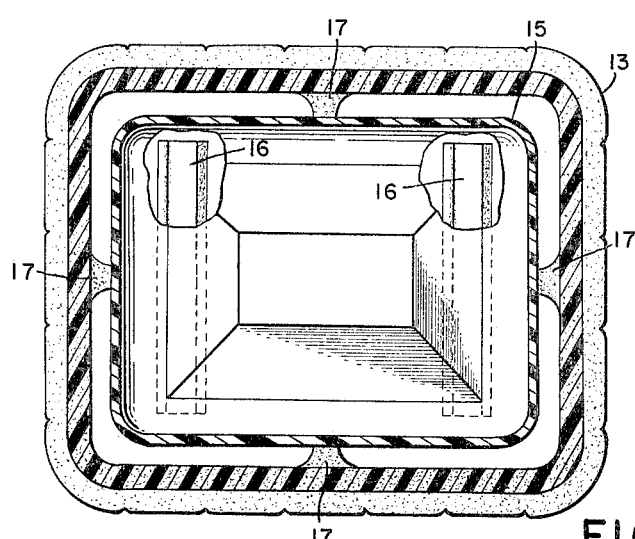
FIG. 4 is a horizontal sectional view along the line 4—4 of FIG. 1.
Figure 8:
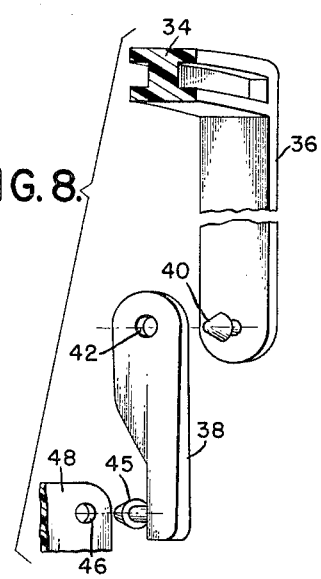
FIG. 8 is a fragmentary exploded view in perspective of several members comprising the handle structure of the embodiment.
Figure 5:
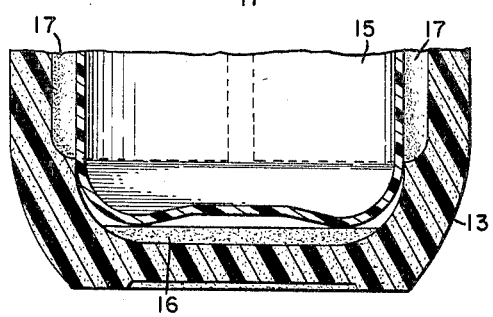
FIG. 5 is a sectional view along the line 5—5 of FIG. 3.
Figure 3:
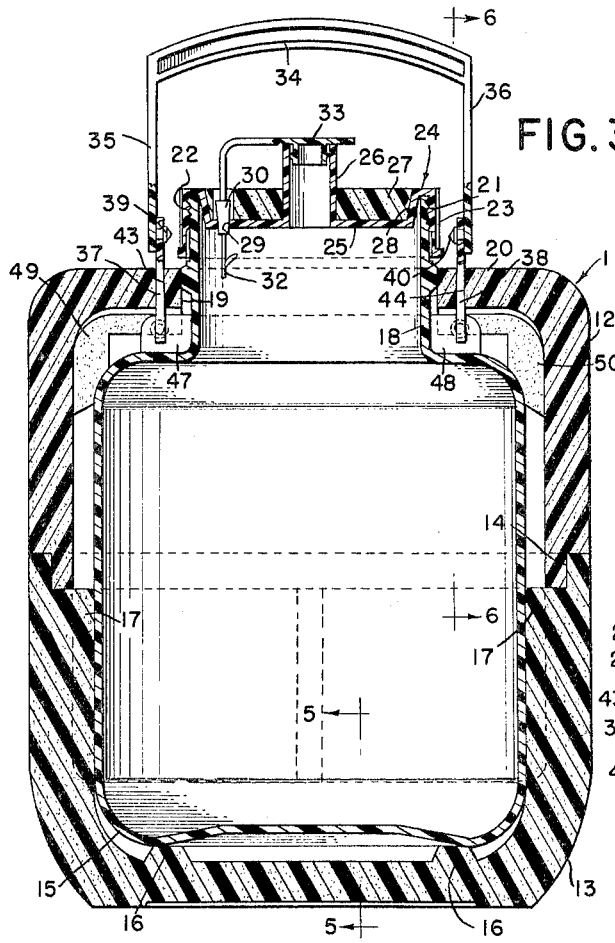
FIG. 3 is a vertical sectional view along the line 3—3 of FIG. 2.
Figure 7:
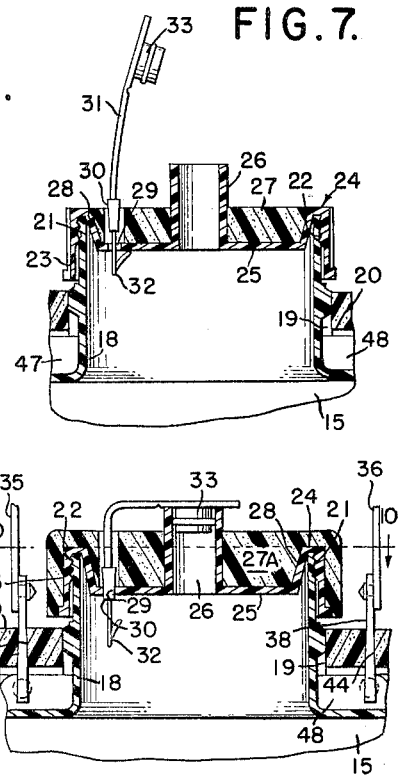
FIG. 7 is a sectional view of a portion of the upper section of the embodiment with parts positioned for pouring out liquid contents.

Referring with more particularity to the drawing, the embodiment illustrated comprises an outer casing 11 of a relatively thick, bulky, foamed plastic material such as foamed polystyrene which is typically very light in weight, formed of an upper section 12 and a lower section 13 glued together along a rabbeted joint 14.

On the interior of the casing, there is disposed the body portion of a bottle 15 of a non-porous plastic material such as polystyrene. This body portion is of a size to be disposed in spaced relation to the interior wall surfaces of the casing 11 and it is supported in this spaced relation by enlargements 16 of the casing extending upwardly from the bottom wall of the casing and enlargements 17 of its side walls extending inwardly therefrom.

The bottle 15 also comprises a neck portion 18 which projects upwardly through and beyond an opening 19 in the top wall 20 of the casing. The upper end of the neck portion 18 is provided with external threads 21 to threadedly engage the interior threads 22 on the vertical annular flange 23 of a cover 24.

Figure 9:
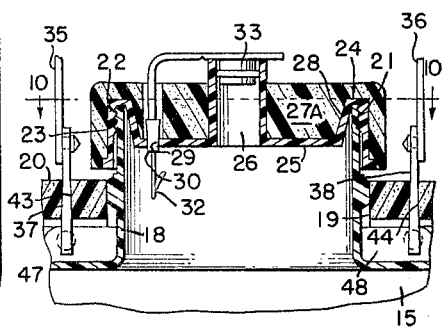
FIG. 9 is a vertical sectional view of a modified portion of the upper section.
Figure 6:
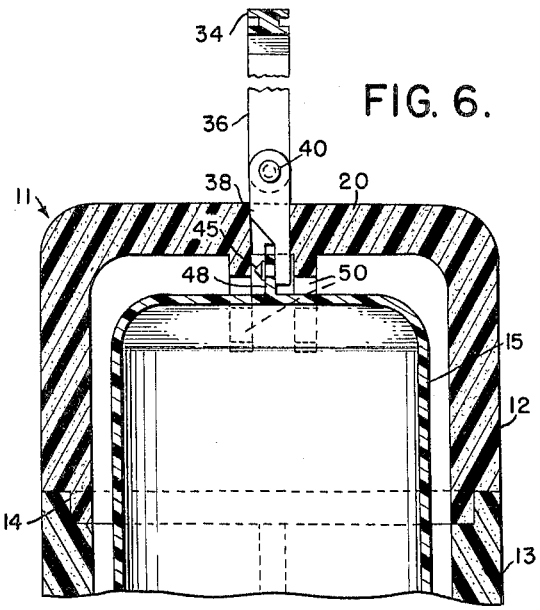
FIG. 6 is a sectional view along the line 6—6 of FIG. 3.
Figure 10:
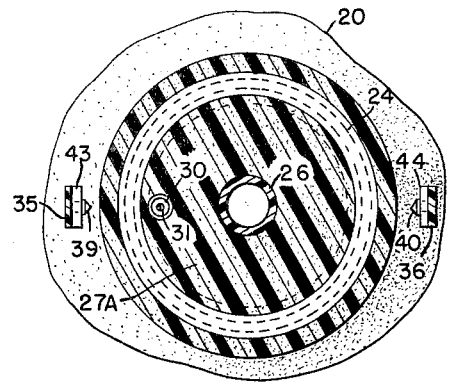
FIG. 10 is a horizontal sectional view along the line 10—10 of FIG. 9.

The center portion 25 of the cover 24 is downwardly recessed and a pouring spout 26 is formed integral therewith. The pouring spout extends upwardly beyond the top of the cap and a panel 27 of foamed plastic, which may be similar to that of the casing, as an insulating material is provided in the recessed space of the cover between the spout 26 and the wall 28 adjacent the inner side of the neck. In the modification of FIGS. 9 and 10, an insulating panel 27A is provided to extend over the entire outer surface of the cover, including the flange 23.

Between the spout 26 and the wall 28 a breather aperture 29 is provided in the portion 25 and it is normally closed when liquid is not being poured from the bottle by a tapered plug 30. The plug is preferably of a plastic material and it is formed integral with a plastic cord 31 that is somewhat semi-rigid and resilient, a portion of which extends below the plug and is fashioned in the form of a V-hook 32 as a detent to oppose disengagement with the aperture 29 and yet permit its ready insertion therein for purposes of assembly.

A cap 33 for the pouring spout 26 is also integral with the cord 31 which thus serves to connect it to the plug 30.

A handle 34 for the container has side arms 35, 36 which are pivotally connected to the upper ends of links 37, 38, respectively, by means of snap buttons 39, 40 integral with the arms 35, 36 engaging apertures 41, 42, respectively, of the links. The lower ends of the links are disposed in the space between the upper walls of the casing and bottle on either side of the neck 18 and project upwardly through slots 43, 44, respectively, in the casing. The lower ends of the links are provided with snap buttons 45 which engage apertures 46 in fin lobes 47, 48 integral with the bottle. The upper wall 20 of the casing has enlarged portions 49, 50 that project inwardly to contact the bottle on either side of the lobes 47, 48 as abutments against relative upward movement.

The handle 34, said arms 35, 36, and the links 37, 38 are all non-metallic members of a light plastic material, such as polystyrene.

By these means the device as a whole can be readily assembled without the use of any separate fastening means and provides an all plastic heat insulated jug completely free of any metallic parts whereby high thermal insulation efficiency is achieved. The thermal efficiency is also increased by virtue of the fact that not only is the casing 11 formed of a heat insulating material but there is provided between it and the bottle an insulating air space which contributes markedly to the insulating value of the device as a whole.

Having thus described my invention, I claim:

1. A heat insulated jug comprising a plastic bottle, a casing of relatively weak, thick foamed plastic surrounding said bottle, said casing having walls with their interior surfaces facing the bottle, means integral with the walls projecting inwardly to contact the bottle and hold it in spaced relation to said surfaces, a handle on the exterior of the casing, and means attaching the handle to the bottle on the interior of the casing exclusively of any attachment of the handle to the casing, whereby when the jug is carried by the handle, the weaker casing section will be supported by the stronger plastic bottle.

2. A heat insulated jug as defined by claim 1 in which the bottle comprises a neck portion at the top and the casing has an opening through which the neck portion projects, said neck portion having an opening for the passage of liquids, a cover member removably engaged with said neck portion over the opening therein, said cover member having a pouring spout and a panel of foamed plastic extending from the spout throughout its exterior surfaces.

3. An all plastic heat insulated jug comprising a bottle consisting of a plastic material, a casing consisting of a relatively weak, thick bulky foamed plastic material surrounding said bottle, said casing having walls with interior surfaces facing the bottle and enlarged portions extending inwardly to contact the bottle and hold it in spaced relation to said surfaces, a handle on the exterior of the casing, and means attaching the handle to the bottle on the interior of the casing and exclusively of any attachment of the handle to the casing, whereby when the jug is carried by the handle, the weak casing section will be supported by the stronger plastic bottle.

4. A heat insulated jug as defined by claim 3 in which the casing has a top wall, said wall having an aperture therethrough, said bottle having a neck portion projecting through said aperture to the exterior of the casing, said neck portion having an opening on the exterior of the casing through which liquid is poured between the interior of the bottle and the exterior, a cover member for said opening removably engaging said neck portion, a pouring spout integral with said cover member, and a panel of foamed plastic extending from the spout over exterior surfaces of the cover member.

5. A heat insulated jug as defined by claim 3 in which the casing has a top wall, said wall having an aperture therethrough, said bottle having a neck portion projecting through said aperture to the exterior of the casing, said neck portion having an opening on the exterior of the casing through which liquid is poured between the interior of the bottle and the exterior, a cover member for said opening removably engaging said neck portion, a pouring spout integral with said cover member, said cover member having a breathing aperture spaced from the said spout, a plug on the exterior of the cover member for removable disposition in said breathing aperture, a detent on the interior side of the cover member, and means passing through and narrower than said breathing aperture connecting said plug and detent together in spaced relation.

6. A heat insulated jug comprising a bottle, a casing surrounding said bottle, said casing having top, side, and bottom walls with interior surfaces facing the bottle and enlarged portions thereof extending inwardly to contact the bottle and hold it in spaced relation to said surfaces; a handle member on the exterior of the casing; a pair of links between either side of said handle member and said bottle, said links being disposed through said top wall with their upper ends on the exterior of the casing pivotally connected to the handle and their lower ends on the interior of the casing connected to said bottle.

7. A heat insulated jug as defined by claim 6 in which the links are connected to the handle and bottle by means of snap buttons.

8. A heat insulated jug as defined by claim 7 in which the bottle is provided with integral fins to which the links are connected.

References Cited by the Examiner

UNITED STATES PATENTS

| | | | |
|---|---|---|---|
| 866,779 | 9/1907 | Faichnie | 222—183 |
| 1,281,340 | 10/1918 | Geary | 220—91 |

THERON E. CONDON, *Primary Examiner.*

EARLE J. DRUMMOND, *Examiner.*

JAMES R. GARRETT, *Assistant Examiner.*